US008225349B2

(12) United States Patent
Yoon et al.

(10) Patent No.: US 8,225,349 B2
(45) Date of Patent: Jul. 17, 2012

(54) APPARATUS FOR RECEIVING DIGITAL MULTIMEDIA BROADCASTING CHANNELS

(75) Inventors: Sang-Hyeon Yoon, Seoul (KR); Sun-Hee Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 305 days.

(21) Appl. No.: 11/483,476

(22) Filed: Jul. 10, 2006

(65) Prior Publication Data

US 2007/0022454 A1 Jan. 25, 2007

(30) Foreign Application Priority Data

Jul. 9, 2005 (KR) ........................ 10-2005-0061971

(51) Int. Cl.
*H04N 5/445* (2006.01)
*H04N 7/16* (2006.01)
*H04N 5/50* (2006.01)
*G06F 3/00* (2006.01)

(52) U.S. Cl. ................ 725/38; 725/41; 725/43; 725/46; 725/56; 725/62; 725/151; 348/732; 348/565

(58) Field of Classification Search .................... 725/38, 725/41, 43, 46, 56, 62, 131, 151; 348/732, 348/565
See application file for complete search history.

(56) References Cited

U.S. PATENT DOCUMENTS 5,161,019 A * 11/1992 Emanuel ......................... 725/56
5,818,541 A * 10/1998 Matsuura et al. ............. 348/565
6,118,498 A * 9/2000 Reitmeier ..................... 348/725
6,714,264 B1 * 3/2004 Kempisty ...................... 348/732
6,731,345 B2 * 5/2004 Lee .............................. 348/553
6,934,917 B2 * 8/2005 Lin .............................. 715/811
6,956,623 B1 * 10/2005 Staller .......................... 348/731
7,227,583 B2 * 6/2007 Sin ............................... 348/570
7,379,122 B2 * 5/2008 Bae et al. ...................... 348/732
7,383,567 B2 * 6/2008 Cang et al. .................... 725/131
7,668,520 B2 * 2/2010 Goto .......................... 455/185.1
7,712,123 B2 * 5/2010 Miyaoku et al. .............. 725/109
7,814,421 B2 * 10/2010 Reynolds et al. ............. 715/716
2002/0175953 A1 * 11/2002 Lin .............................. 345/811
2003/0097659 A1 * 5/2003 Goldman ........................ 725/89
2003/0115589 A1 * 6/2003 D'Souza et al. ................ 725/10
2004/0244048 A1 * 12/2004 Wada et al. ................... 725/120
2005/0114885 A1 * 5/2005 Shikata et al. .................. 725/38
2005/0273833 A1 * 12/2005 Soinio .......................... 725/113
2006/0271971 A1 * 11/2006 Drazin ............................ 725/86
2011/0173664 A1 * 7/2011 Knudson .......................... 725/46

FOREIGN PATENT DOCUMENTS

CN 1154625 7/1997
CN 1302506 7/2001
EP 1 185 087 3/2002
JP 2001-036835 2/2001
JP 2002-077458 3/2002
JP 2002-125158 4/2002

(Continued)

*Primary Examiner* — Brian Pendleton
*Assistant Examiner* — Pinkal R Chokshi
(74) *Attorney, Agent, or Firm* — The Farrell Law Firm, P.C.

(57) ABSTRACT

Disclosed is a digital broadcast receiver including a Digital Multimedia Broadcasting (DMB) module for receiving digital broadcastings of multiple channels; an output unit for outputting voice and image signals of the digital broadcastings; and a controller for controlling the DMB module to receive the digital broadcastings while successively and automatically switching the channels at a predetermined time interval, and controlling the digital broadcasting data received in the DMB module to be transmitted to the output unit.

12 Claims, 6 Drawing Sheets

FOREIGN PATENT DOCUMENTS

| | | |
|---|---|---|
| JP | 2002-335459 | 11/2002 |
| JP | 2005-064566 | 3/2005 |
| KR | 1019940023202 | 10/1994 |
| KR | 1020020018604 | 3/2002 |
| WO | WO 99/16247 | 4/1999 |
| WO | WO 2004/030352 | 4/2004 |
| WO | WO 2005/060113 | 6/2005 |

* cited by examiner

APPARATUS FOR RECEIVING DIGITAL MULTIMEDIA BROADCASTING CHANNELS

PRIORITY

This application claims priority under 35 U.S.C. §119 to an application entitled "Apparatus for receiving Digital Multimedia Broadcasting Channels" filed in the Korean Intellectual Property Office on Jul. 9, 2005 and assigned Serial No. 2005-61971, the contents of which are incorporated herein by reference.

BACKGROUND OF THE INVENTION

1. Field of the Invention

The present invention relates to an apparatus and a method for receiving digital broadcasting, and more particularly to a digital broadcast receiver for providing an automatic channel switching function of digital broadcasting.

2. Description of the Related Art

A Digital Multimedia Broadcasting (DMB) service is a broadcasting service in which users can watch multimedia broadcastings through multi-channels by means of a personal portable receiver or a vehicle receiver, which has a non-directional receive antenna, even while the users are moving. Specifically, a satellite DMB adopted in Korea corresponds to an International Telecommunication Union (ITU) standard Rec.BO.1130-4: System-E, and employs Code Division Multiplexing (CDM) technology which is similar to a Code Division Multiple Access (CDMA) mobile telephone technology.

Typically, a satellite DMB uses a Motion Picture Experts Group (MPEG)-2 Transport Stream (TS) as a transmission standard. According to such a DMB broadcasting standard, a DMB broadcasting channel includes a pilot channel for transmitting configuration information of a CDM channel having Walsh code information, a Conditional Access System (CAS) channel for transmitting authentication information for DMB broadcasting reception, an Electronic Program Guide (EPG) channel for transmitting information for a service channel, and at least one media channel for actually transmitting TS packet data.

A digital broadcasting center transmits Program Specific Information (PSI) to a digital broadcast receiver, and the digital broadcast receiver may receive TS data according to channels selected by a user with reference to the PSI. The PSI includes a Service Description Table (SDT), a Program Association Table (PAT), and a Program Map Table (PMT). The SDT includes broadcasting service channels currently being provided, and information relating to the broadcasting service channels. A user may select desired channels with reference to the SDT. The PAT includes the Packet Identification (PID) of a PMT having the ID of a broadcasting channel currently being provided and additional information of the broadcasting channel. Last, the PMT includes PIDs of video and audio TSs corresponding to each individual broadcasting channel.

That is, in order to output DMB of a predetermined broadcasting channel, the digital broadcast receiver must know the PID's Packet Elementary Stream Packet Identification (PES PID) of TS packet data of the channel. The PES PID can be understood by detecting the ID of the channel, which has been selected by a user from the SDT, from the PAT and the PMT.

Accordingly, the digital broadcast receiver receives only TS packet data having a PES PID of the channel selected by the user, thereby providing the user with a DMB service for the channel selected by the user. For this, the digital broadcast receiver must filter only the TS packet data, which has the PES PID of the channel selected by the user, from TS packet data broadcasted from a digital broadcasting reception center. A Walsh code is used for the filtering of the TS packet data.

The Walsh code represents a kind of set of orthogonal codes. In an MPEG-2 which is a transmission standard of a terrestrial DMB, the Walsh code is used in order to filter only the TS packet data of a specific channel. Information for the Walsh code is transmitted through the pilot channel of the five channels in the DMB transmission standard as described above. The digital broadcast receiver receives information for a range of a maximum PID value and a range of a minimum PID value for each CDM channel from the pilot channel. Accordingly, when a user selects one channel, the digital broadcast receiver sets a Walsh code value for the corresponding channel in a DMB module, and filters only TS packets having PES PIDs within the maximum/minimum PID range of the set Walsh code for reception.

That is, in order to receive the TS packet data corresponding to the channel selected by the user, the digital broadcast receiver must search for Walsh codes corresponding to PMT PIDs and PES PIDs of the channel selected by the user, and set Walsh codes searched by a baseband processor.

FIG. 1 is a block diagram illustrating the construction of the conventional digital broadcast receiver. The conventional digital broadcast receiver includes a DMB module 10, a TS demultiplexer 20, a codec 30, a speaker 40, and a display unit 50. The DMB module 10 selects and receives a CDM channel corresponding to a broadcasting channel selected by a user, and outputs TS data for a corresponding broadcasting channel.

The TS is illustrated in FIG. 2 which is a diagram illustrating the structure of a conventional transport stream (TS) data output from a digital multimedia broadcasting (DMB) module. The TS 60 output from the DMB module 10 includes a stream type field 61, a channel number field 62, a PID field 63, and an audio PMT PID field 64. The stream type field 61 represents an audio type TYPE_AUDIO or a video type TYPE_VIDEO representing the type of information contained in the TS data stream as will be described below. The channel number field 62 represents a current channel number, and the PID field 63 represents a PID for a current channel. When a current stream is an audio stream, the PID corresponds to an audio service ID. However, when the current stream is a video stream, the PID corresponds to a PMT PID of a corresponding channel. The audio PMT PID field 64 is a valid field only when a stream type is audio, and becomes a PMT PID of a corresponding audio channel. When the stream type is not an audio, the field has a value of 0 i.e., a "0" is sent.

The TS demultiplexer 20 having received the TS data demultiplexes the TS data according to each broadcasting channel, and provides the codec 30 with the demultiplexed data. The codec 30 converts digital signals to voice signals or image signals, and outputs the voice signals and the image signals to the speaker 40 and the display unit 50, respectively.

In the digital broadcast receiver, a user manually and successively inputs a channel switching key and views programs currently being provided on a one-by-one basis, in order to select a desired program from the programs currently being provided. However, it takes about 4-5 seconds to switch from one channel to the next channel. Therefore, because of the lengthy switching times, the user is inconvenienced when switching channels to select a desired broadcast.

SUMMARY OF THE INVENTION

Accordingly, the present invention has been made to solve the above-mentioned problems occurring in the prior art, and it is an object of the present invention to provide a method for providing an automatic channel switching mode to a user in a digital broadcast receiver and the digital broadcast receiver using the same.

It is another object of the present invention to provide an apparatus capable of switching channels and minimizing time required for broadcasting channel switching in an automatic channel switching mode in a digital broadcast receiver.

In order to accomplish the aforementioned object, according to one aspect of the present, there is provided a digital broadcast receiver including a Digital Multimedia Broadcasting (DMB) module for receiving digital broadcastings of multiple channels; an output unit for outputting voice and image signals of the digital broadcastings; and a controller for controlling the DMB module to receive the digital broadcastings while successively and automatically switching the channels at a predetermined time interval, and controlling the digital broadcasting data received in the DMB module to be transmitted to the output unit.

In order to accomplish the aforementioned object, according to another aspect of the present, there is provided a digital broadcast receiver including a Digital Multimedia Broadcasting (DMB) module for receiving at least two broadcasting channels, generating Transport Stream (TS) data for the corresponding broadcasting channels, and outputting the generated TS data; an output unit for outputting voice and image signals of a digital broadcasting; a channel setup controller for controlling the DMB module to receive the at least two broadcasting channels, which are determined based on a predetermined broadcasting channel list, at a predetermined time interval; at least two buffers for buffering data of the at least two broadcasting channels; and a switch for alternately switching the at least two buffers to the output unit at the predetermined time interval, the switch being located between the at least two buffers and the output unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description, a detailed description of known functions and configurations incorporated herein will be omitted when it may obscure the subject matter of the present invention.

According to the first embodiment of the present invention, a digital broadcast receiver successively switches multiple digital broadcasting channels at a predetermined time interval and outputs digital broadcasting to a user. When key input is received from the user while the digital broadcasting is output to the user, the digital broadcast receiver stops an automatic channel switching and continuously outputs the broadcasting currently being provided. Accordingly, the user can view the currently provided digital broadcasting channels through an automatic switching without manipulating any channel control keys, and can also continuously watch and/or listen to a desired broadcasting by selecting the broadcasting when the broadcasting is output, in the digital broadcasting receiver.

According to the second embodiment of the present invention, a digital broadcast receiver receives, in advance, a digital broadcasting channel to be output directly after the currently output digital broadcasting channel in order to minimize waiting time due to switching of a digital broadcasting channel in an automatic channel switching mode. Specifically, the digital broadcast receiver opens at least four CDM channels corresponding to two broadcasting channels for video broadcasting in order to be applied to a video broadcasting channel. Further, the digital broadcast receiver outputs and displays one broadcasting channel data of two received broadcasting channels and buffers the other broadcasting channel data. After predetermined time lapses, the digital broadcast receiver outputs the buffered broadcasting channel data, and receives and buffers other broadcasting channel data. Because the other broadcasting channels have already been buffered, time required for outputting a broadcasting after switching channels is minimized. As described above, the digital broadcast receiver minimizes the time necessary for switching of broadcasting channels between display of broadcasting channels, which is carried out at a predetermined time interval.

Figure 3:
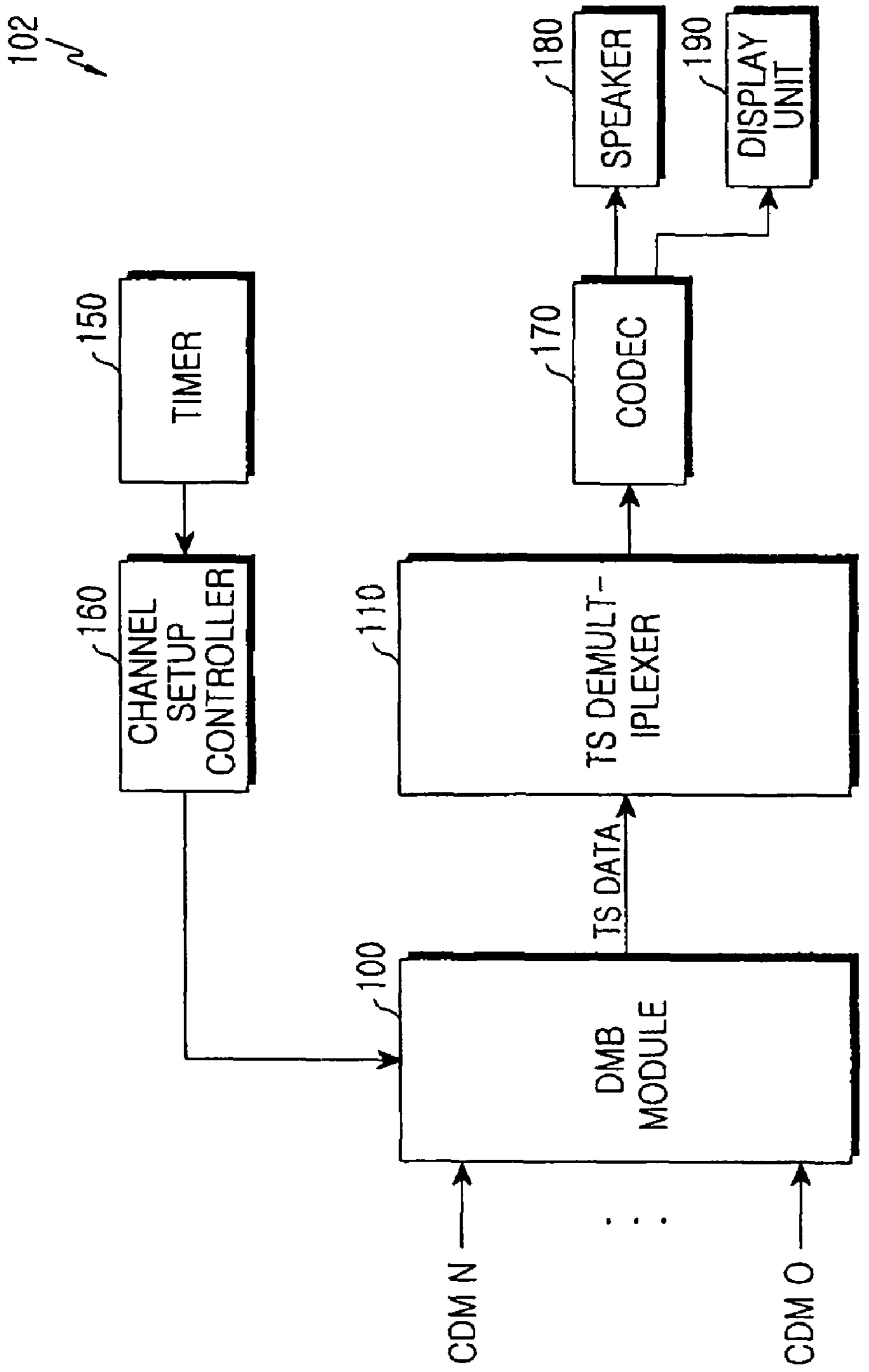
FIG. 3 is a block diagram illustrating the construction of a digital broadcast receiver according to a first embodiment of the present invention.

FIG. 3 is a block diagram illustrating the construction of a digital broadcast receiver according to the first embodiment of the present invention.

The digital broadcast receiver 102 according to the first embodiment of the present invention successively switches a digital broadcasting channel at a predetermined time interval and outputs digital broadcastings of each channel. For this, the digital broadcast receiver includes a Digital Multimedia Broadcasting (DMB) module 100, a Transport Stream (TS) demultiplexer 110, a timer 150, a channel setup controller 160, a codec 170 and an output unit, a speaker 180 and a display unit 190.

The DMB module 100 receives predetermined digital broadcasting channels having been set by the channel setup controller 160. The channel setup controller 160 sets the digital broadcasting channels determined by a predetermined broadcasting channel list to be received in the DMB module 100.

The channel setup controller 160 receives interrupt signals from the timer 150 at a predetermined time interval. The timer 150 provides the interrupt signals to the channel setup controller 160 at a predetermined time interval. When the interrupt signals are received from the timer 150, the channel setup controller 160 sets different digital broadcasting channels other than the currently received digital broadcasting channels to be received in the DMB module 100 according to the predetermined channel list. That is, the channel setup controller 160 controls a switching of the digital broadcasting channels received in the DMB module 100. As described above, the channel setup controller 160 controls the DMB module 100 to receive digital broadcastings while switching multiple digital broadcasting channels at the predetermined time interval.

Information for the digital broadcasting channels can be acquired through an Electronic Program Guide (EPG) channel. The predetermined broadcasting channel list may be automatically generated in the digital broadcast receiver according to a user's broadcasting channel preference. In the predetermined broadcasting channel list, an order of broadcasting channels may be determined according to the user's selection. Further, the channel setup controller 160 may use a broadcasting channel list acquired through the EPG channel.

The channel setup controller 160 stops the setup operation to the DMB module 100 while switching digital broadcasting channels in response to a predetermined event generated in the digital broadcast receiver 102. The predetermined event may be key input by a user, batterycharge level, etc. Further, the event may be a message or call reception or termination when the digital broadcast receiver is embodied in a mobile communication terminal. It should be understood that the scope of the present invention is not limited to these examples. That is, the predetermined event may be an event generated in the digital broadcast receiver 102 or any other single or combination of events generated in other apparatuses inter-working with the digital broadcast receiver 102.

Referring to FIG. 3, the DMB module 100 opens a CDM channel corresponding to the digital broadcasting channel determined by the channel setup controller 160, and receives broadcasting channel data. The DMB module 100 generates TS data based on the received broadcasting channel data and transfers the generated TS data to the TS demultiplexer 110.

When the TS data are received from the DMB module 100, the TS demultiplexer 110 demultiplexes the TS data and provides the demultiplexed data to the codec 170. The codec 170 converts digital signals to voice signals and/or image signals, and outputs the voice signals and/or the image signals to the speaker 180 and the display unit 190, respectively. The speaker 180 outputs the voice signals and the display unit 190 outputs the image signals.

The digital broadcasting output from the digital broadcast receiver may be displayed in various ways. For example, image signals may be displayed on the full screen of the display unit 190 in the digital broadcast receiver.

Alternatively, the image signals may be partially displayed on any portion of the screen of the display unit 190 in the digital broadcast receiver according to a predetermined scheme such as a Picture-in-Picture (PIP) scheme. That is, in a state in which another moving picture or an image is displayed on the main screen of the display unit 190, an automatically channel-switched digital broadcasting is displayed on the sub-screen of the display unit 190. In this case, it is not preferred that the digital broadcast receiver does not output voice signals of the digital broadcasting channel to the speaker 180.

According to the first embodiment of the present invention as described above, the digital broadcast receiver automatically switches and outputs digital broadcasting channels at a predetermined time interval, so that a user can successively watch various broadcasting programs without manipulating channel controls to change channels. Further, the digital broadcast receiver ends the automatic channel switching mode when key input or another event occurs during output of desired digital broadcasting.

Figure 4:
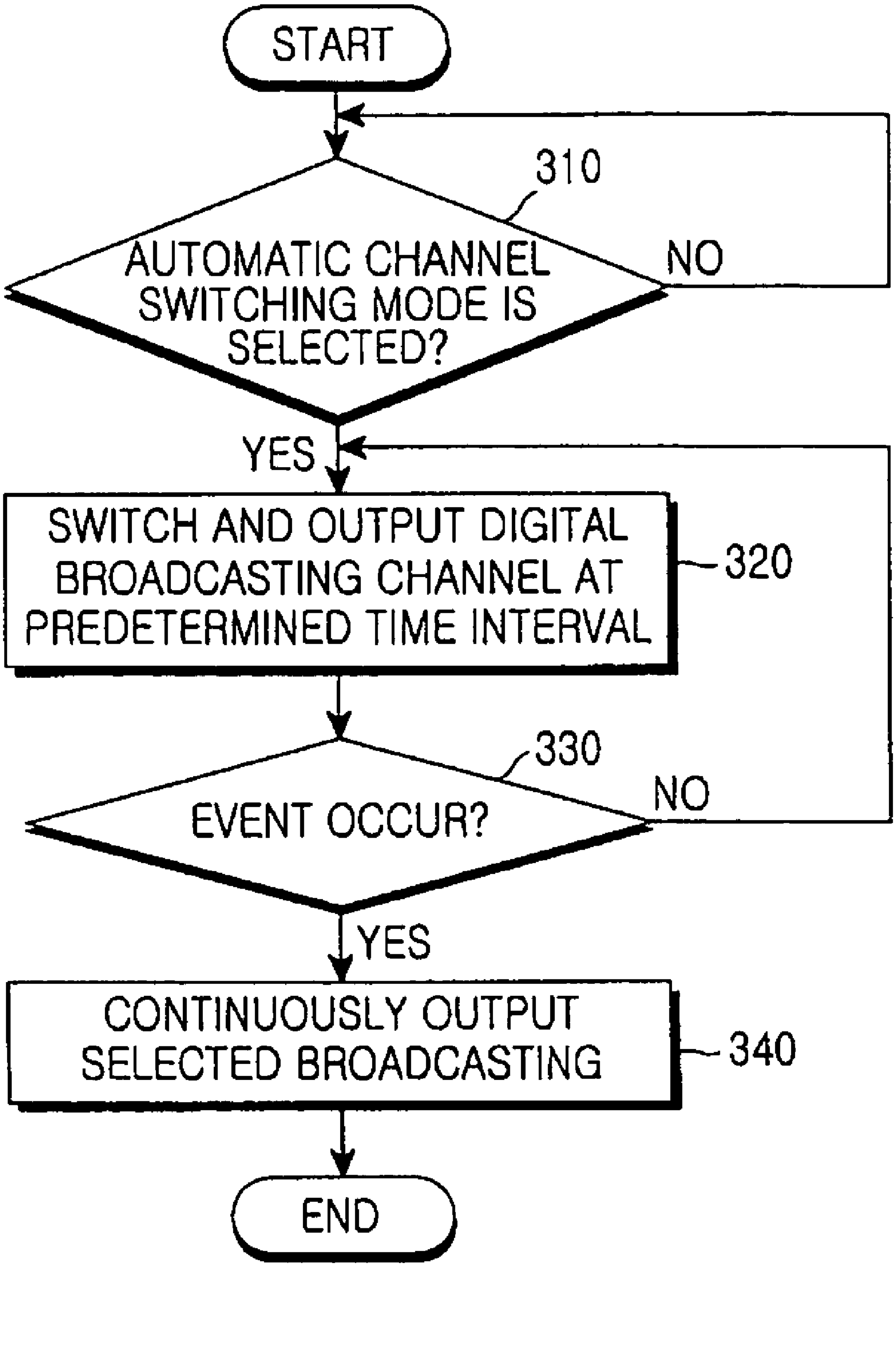
FIG. 4 is a flow chart illustrating a method for receiving digital broadcasting in an automatic channel switching mode according to a first embodiment of the present invention.

FIG. 4 is a flow chart illustrating a method for receiving the digital broadcasting in the automatic channel switching mode according to the first embodiment of the present invention.

Referring to FIG. 4, in step 310, the digital broadcast receiver determines whether the automatic channel switching mode has been selected by a user. When it is determined that the automatic channel switching mode has been selected by the user, the digital broadcast receiver switches and outputs digital broadcastings at a predetermined time interval in step 320. The predetermined time interval is determined by adding time required for a digital broadcasting channel switching to time required for recognition of the corresponding digital broadcasting channel by the user. For example, it is preferred that the predetermined time interval is about 10 seconds. The digital broadcasting channel switching requires about 3-4 seconds and the user can watch a digital broadcasting during 5-6 seconds (between channel switching), and recognize if the currently displayed broadcasting is a desired digital broadcasting for selection. Accordingly, the digital broadcast receiver can display stored still images and moving images during the time required for the digital broadcasting channel switching. Further, it is also possible to display previously stored advertisements or photographs.

The automatically channel-switched digital broadcasting as described above may be displayed on the full screen of the display unit 190 or partially displayed on any portion of the screen of the display unit 190 according to a PIP scheme.

In step 330, the digital broadcast receiver determines if a predetermined event has occurred. The predetermined event may be key input by the user, a call reception, etc. The user can select a corresponding broadcasting by means of a predetermined key, etc., when a desired broadcasting is output from among circular broadcastings output at the predetermined time interval. Herein, the user can select a desired digital broadcasting channel simply by pressing any one of the keys installed in the digital broadcast receiver. Of course, a specific key may be designated for selection of a digital broadcasting channel from the keys installed in the digital broadcast receiver.

The predetermined event denotes occurrence of an interrupt having a priority higher than digital broadcasting output in the digital broadcast receiver. As described above, in an apparatus generated by integrating a mobile communication terminal with the digital broadcast receiver, the predetermined event may be a call termination, an SMS message termination, an alarm, a schedule, etc. When the predetermined event occurs the digital broadcast receiver continuously outputs the selected broadcasting in step 340.

Meanwhile, when the predetermined event occurs while the image signals are displayed on the sub-screen of the display unit 190 in the digital broadcast receiver according to a PIP scheme, the digital broadcast receiver controls the digital broadcasting channel displayed on the sub-screen to be continuously displayed on the main-screen. Herein, other digital broadcasting channels may be switched and displayed on the sub-screen as desired by the user, manufacturer, service provider, etc. Further, it may be impossible to display the sub-screen on the display unit 190. This is an option that may be selected by a user or a manufacturer.

However, when the predetermined event does not occur, step 320 is performed. That is, the digital broadcast receiver switches and outputs a digital broadcasting channel at a predetermined time interval.

According to the first embodiment of the present invention, the digital broadcast receiver requires about 4-5 seconds for a channel switching. Therefore, the user must wait time after the broadcasting channel switching before another channel switching can be completed. According to another embodiment of the present invention, the digital broadcast receiver minimizes the time required for the channel switching in the automatic channel switching mode.

Figure 5:
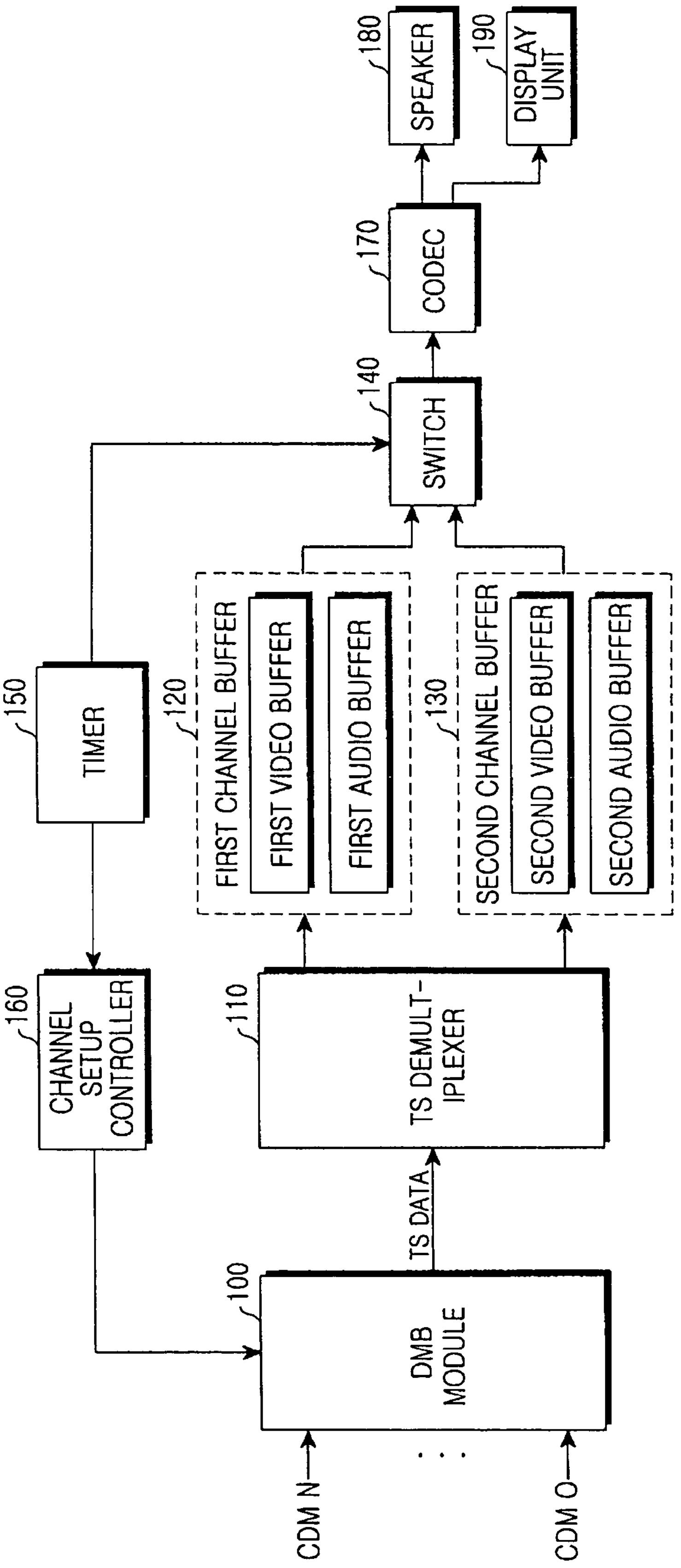
FIG. 5 is a block diagram illustrating the construction of a digital broadcast receiver according to a second embodiment of the present invention.

FIG. 5 is a block diagram illustrating the construction of a digital broadcast receiver according to second embodiment of the present invention.

Referring to FIG. 5, the digital broadcast receiver includes a DMB module 100, a TS demultiplexer 110, a first channel buffer 120, a second channel buffer 130, a switch 140, a timer 150, a channel setup controller 160, a codec 170, and an output unit including a speaker 180 and a display unit 190.

The digital broadcast receiver according to the second embodiment of the present invention successively switches a digital broadcasting channel at a predetermined time interval and outputs digital broadcastings of each channel. Accordingly, the DMB module 100 receives broadcasting channels to be currently output (e.g., the current channel) and the subsequent broadcasting channels to be output later. The DMB module 100 changes the received broadcasting channels at a predetermined time interval by the channel setup controller 160. The channel setup controller 160 sets a Walsh code corresponding to CDM channels to be received.

Specifically, the DMB module 100 receives CDM channels based on two broadcasting channels determined by the channel setup controller 160. The DMB module 100 generates and outputs TS data for the received broadcasting channels. Between the two broadcasting channels, one is buffered for a current user and is simultaneously output, and the other is buffered. The two broadcasting channels are determined by the channel setup controller 160 based on a predetermined broadcasting channel list, and provided to the DMB module 100.

The channel setup controller 160 controls the DMB module 100 to receive the two broadcasting channels determined based on the predetermined broadcasting channel list at a predetermined time interval. The passage of the predetermined time interval is notified to the channel setup controller 160 by the timer 150. That is, the timer 150 outputs interrupt signals at a predetermined time intervals and provides the interrupt signals to the switch 140 and the channel setup controller 160. When the interrupt signals are received from the timer 150, the channel setup controller 160 controls the DMB module 100 to receive both a broadcasting channel, which is not being output, of the two broadcasting channels being currently received and other broadcasting channels not being currently received. The channel being currently received represents a broadcasting channel currently received in the DMB module 100 from among a plurality of DMB channels, and the channel not being currently received represents remaining broadcasting channels except for the broadcasting channel being currently received from among the DMB channels.

The DMB module 100, channels according to an embodiment of the present invention, receives two broadcasting, outputs one of the broadcasting channels through the speaker 180 or the display unit 190, and does not output the other broadcasting channel. If the interrupt signals are received, the channel setup controller 160 controls the DMB module 100 to receive the broadcasting channel, which are not output through the speaker 180 or the display unit 190 from among the two broadcasting channels being currently received according to the present invention.

That is, the channel setup controller 160 controls a switching of the digital broadcasting channels received in the DMB module 100. In other words, the channel setup controller 160 controls the DMB module 100 to receive digital broadcastings while switching the digital broadcasting channels at the predetermined time intervals according to channels to be currently output and channels to be output later.

Figure 6:
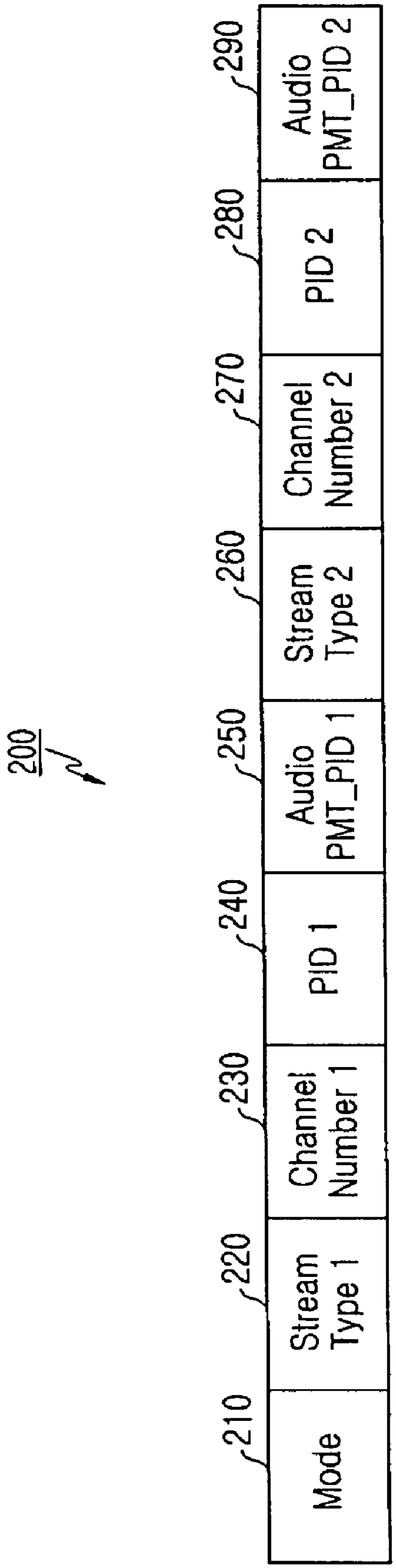
FIG. 6 is a diagram illustrating the structure of a TS according to an embodiment of the present invention.

The DMB module 100 opens a CDM channel corresponding to the two digital broadcasting channels determined by the channel setup controller 160, and receives broadcasting channel data. The DMB module 100 generates TS data as illustrated in FIG. 6 by means of the received broadcasting channel data. Specifically, the DMB module 100 confirms stream types, channel numbers and PIDs of the two received broadcasting channels and then transfers the TS data for the two channels to the TS demultiplexer 110.

Referring to FIG. 6, the TS 200 output from the DMB module 100 includes a mode field 210, a stream type field 220 for one broadcasting channel, a channel number field 230, a PID field 240, an audio PMT PID field 250, a stream type field 260 for another broadcasting channel, a channel number field 270, a PID field 280, and an audio PMT PID field 290.

Figure 1:
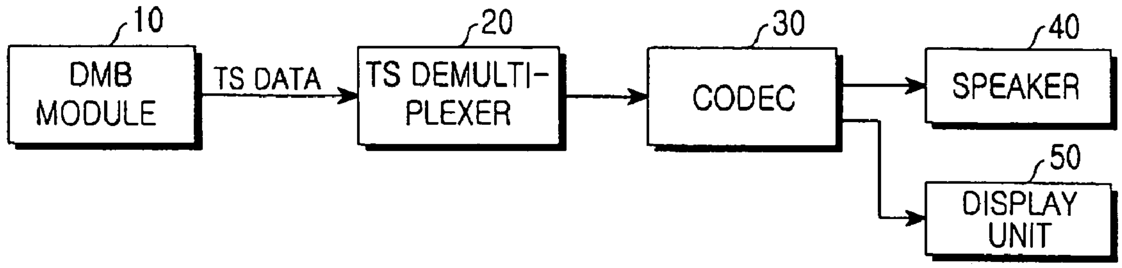
FIG.1 (PRIOR ART)
FIG. 1 is a block diagram illustrating the construction of a conventional digital broadcast receiver.
Figure 2:
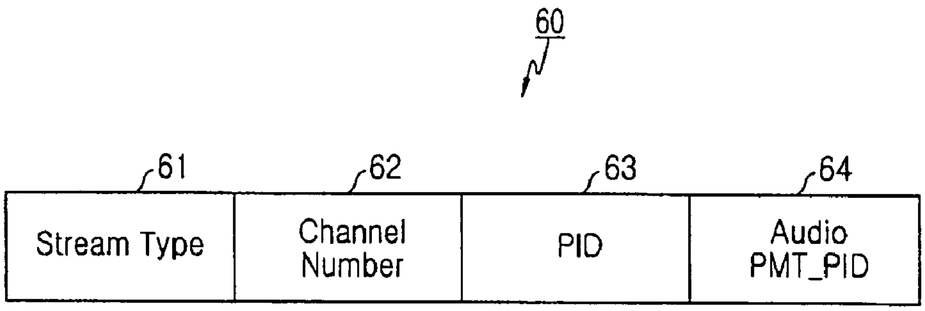
FIG.2 (PRIOR ART)
FIG. 2 is a block diagram illustrating the structure of a conventional TS.

The mode field 210 is used for identifying an automatic channel switching mode or a general channel switching mode. For example, 0x0 is a value for representing the general channel switching mode while 0x01 is a value for representing the automatic channel switching mode. The fields 220, 230, 240, and 250 for said one broadcasting channel, correspond to information for the current channel as described in FIG. 2. The fields 260, 270, 280, and 290 for said another broadcasting channel correspond to information for the next channel. The information for the next channel is valid only when a channel switching mode is the automatic channel switching mode. As described above, the DMB module 100 receives broadcasting channel data for the current channel and broadcasting channel data for the next channel, and transfers the TS data for the two channels to the TS demultiplexer 110.

When the TS data are received from the DMB module 100, the TS demultiplexer 110 demultiplexes the TS data according to each broadcasting channel, and provides the demultiplexed data to the first channel buffer 120 and the second channel buffer 130. The first channel buffer 120 includes a first video buffer and a first audio buffer, and the second channel buffer 130 includes a second video buffer and a second audio buffer. Video channel data for said one broadcasting channel are stored in the first video buffer, and audio channel data for said one broadcasting channel are stored in the first audio buffer. Likewise, video channel data for said another broadcasting channel are stored in the second video buffer, and audio channel data for said another broadcasting channel are stored in the second audio buffer. The broadcasting channel data stored in the channel buffers 120 and 130 are selectively output to the codec 170 by the switch 140. The switch 140 switches the first channel buffer 120 and the second channel buffer 130 to the codec 170 at a predetermined time interval based on the timer 150.

The codec 170 converts digital signals from the first channel buffer 120 or the second channel buffer 130 through the switch 140 to voice signals or image signals, and outputs the voice signals and the image signals to the speaker 180 and the display unit 190, respectively. The speaker 180 outputs the voice signals and the display unit 190 outputs the image signals.

According to the second embodiment of the present invention as described above, the digital broadcast receiver minimizes the time required for the broadcasting channel switching at a predetermined time interval in the automatic channel switching mode.

Figure 7:
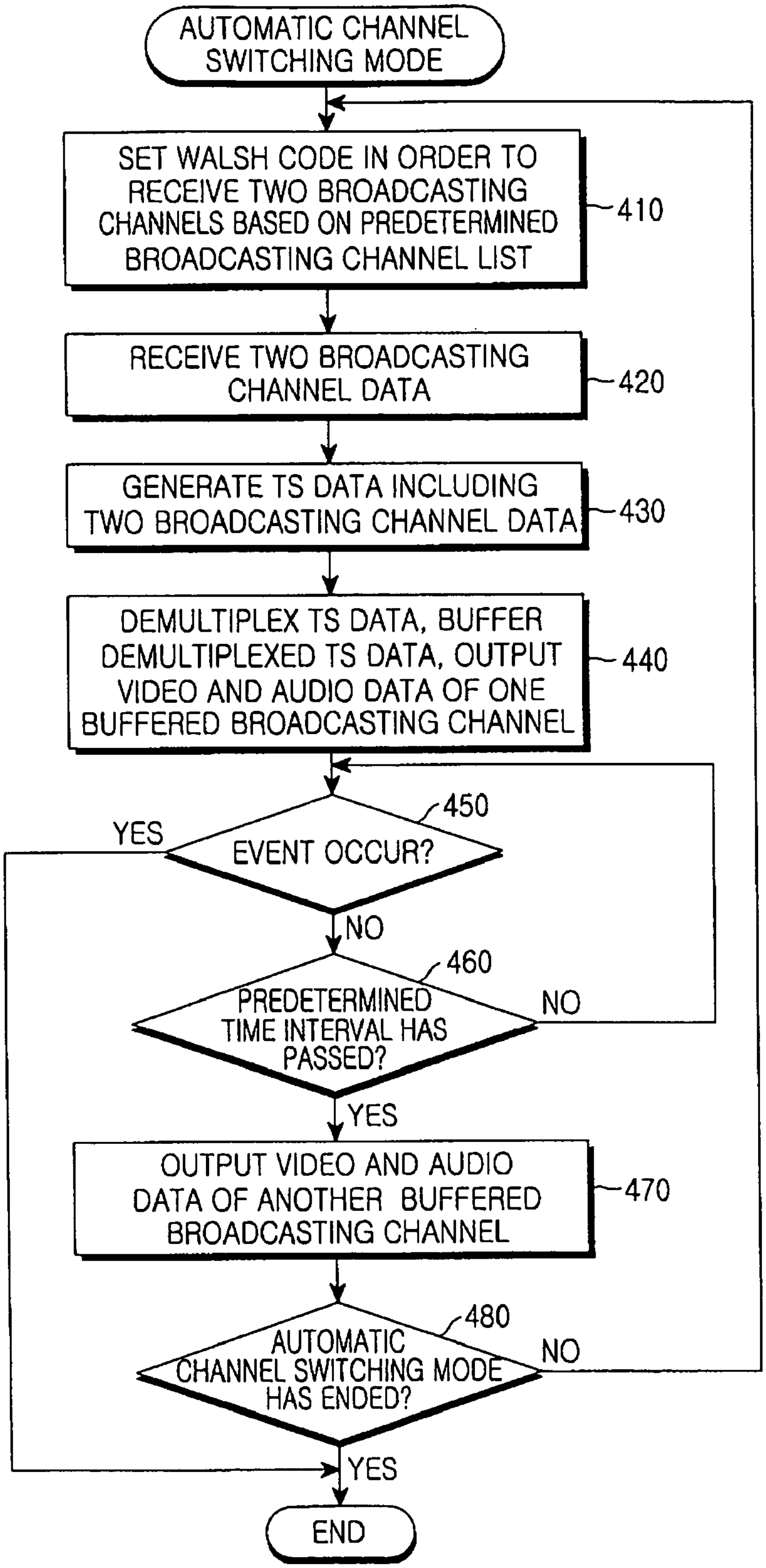
FIG. 7 is a flow chart illustrating a method for receiving digital broadcasting in an automatic channel switching mode according to a second embodiment of the present invention.

FIG. 7 is a flow diagram illustrating a method for receiving the digital broadcasting in the automatic channel switching mode according to the second embodiment of the present invention.

Referring to FIG. 7, in the automatic channel switching mode, the digital broadcast receiver sets a Walsh code in order to receive two broadcasting channels based on a predetermined broadcasting channel list in step 410. One of the two broadcasting channels is a broadcasting channel to be directly output to a user and the other is a broadcasting channel to be output after the directly output broadcasting channel is displayed.

Specifically, the digital broadcast receiver sets a Walsh code value for a CDM channel, which is to be received, in the DMB module 100, and filters and receives only a TS packet having a PES PID within a maximum/minimum PID range of the set Walsh code. That is, the digital broadcast receiver sets Walsh codes for broadcasting channels, which are to be received, in the DMB module 100. In step 420, the digital broadcast receiver receives CDM channels according to the two broadcasting channels based on the set Walsh code. In step 430, the digital broadcast receiver generates TS data including the two received broadcasting channel data.

In step 440, the digital broadcast receiver demultiplexes the TS data according to each broadcasting channel, buffers the demultiplexed TS data, and outputs video and audio data of said one buffered broadcasting channel.

In step 450, the digital broadcast receiver determines if a predetermined event has occurred. The occurrence of the predetermined event denotes occurrence of an interrupt having a priority higher than digital broadcasting output in the digital broadcast receiver. As described above, the predetermined event may be key input by the user. The user can select a desired digital broadcasting channel simply by pressing any one of the keys installed in the digital broadcast receiver.

When the predetermined event has occurred, the digital broadcast receiver ends the automatic channel switching mode and continuously outputs the broadcasting channel being currently output. That is, the digital broadcast receiver stops the automatic channel switching and continuously outputs the broadcasting being currently displayed.

However, when the predetermined event has not occurred and a predetermined time interval has passed in step 460, the digital broadcast receiver outputs video and audio data of said another buffered broadcasting channel in step 470. For example, it is preferred to set the predetermined time interval (which can be set by the user) to have a value so that a user can have sufficient time to watch a digital broadcasting, and can determine whether the digital broadcasting currently being displayed is desired for viewing. Accordingly, if the viewer desires to continue viewing the currently displayed channel, the user can select the channel for viewing using a key entry.

When the automatic channel switching mode has not ended in step 480, step 410 is performed. That is, the digital broadcast receiver receives two broadcasting channels based on the predetermined broadcasting channel list.

Accordingly, the digital broadcast receiver controls the DMB module to receive broadcasting channels to be currently output to the display unit or the speaker and the subsequent broadcasting channels to be output directly after the broadcasting channels.

For example, when the digital broadcast receiver has the predetermined broadcasting channel list as shown in Table 1 below, the digital broadcast receiver receives Channel 1 as digital broadcasting to be currently output and Channel 2 as the subsequent digital broadcasting to be output after Channel 1. Then, the digital broadcast receiver outputs the digital broadcasting data of Channel 1 and buffers the digital broadcasting data of Channel 2.

TABLE 1

| Channel number | Service channel title |
|---|---|
| 1 | SF movie channel |
| 2 | Melodrama channel |
| 3 | EA sports |
| 4 | Current economic news |
| 5 | Tooniverse cartoon |
| . . . | . . . |

Then, when the predetermined time interval has passed and a predetermined event has not occurred, the digital broadcast receiver stops receiving the digital broadcasting of Channel 1 and buffering the digital broadcasting of Channel 2, and receives the digital broadcasting of Channel 2 to be currently output and digital broadcasting of a Channel 3 to be output after Channel 2. Further, the digital broadcast receiver outputs the digital broadcasting of Channel 2 and buffers the digital broadcasting of Channel 3. In this way, the digital broadcast receiver successively outputs digital broadcasting channels in the broadcasting channel list at a predetermined time interval.

In brief, the digital broadcast receiver switches and receives digital broadcasting channels in such a manner that it first receives Channel 1 and Channel 2, receives Channel 2 and Channel 3 after a predetermined time interval passes, and receives Channel 3 and Channel 4 after a predetermined time interval passes again.

Further, when the predetermined event occurs, the digital broadcast receiver stops an automatic channel switching, and continuously receives and outputs the broadcasting being currently displayed.

Accordingly, a user can successively view the broadcasting channels in the digital broadcasting channel list at a predetermined time interval in the digital broadcast receiver. Further, when the user desires to continuously watch the broadcasting being currently displayed, the user can select a corresponding broadcasting only by predetermined key input.

According to the present invention as described above, a digital broadcast receiver successively and automatically switches multiple digital broadcasting channels at a predetermined time interval, outputs broadcasting of a corresponding channel, stops the automatic channel switching when key input is received from a user during the broadcasting, and continuously outputs broadcasting being currently displayed, thereby reducing inconvenience in that the user must view a plurality of programs being currently broadcasted one-by-one while manually and successively inputting a channel switching key in order to select a desired program from those being currently broadcasted, and minimizing the time required for channel switching.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A digital broadcasting receiver in a mobile communication device, the receiver comprising:

a digital broadcasting module for receiving digital broadcasts of multiple channels in the mobile communication device through a wireless communication network;

an output unit for outputting sound and image signals of the digital broadcasts; and a controller for controlling the digital broadcasting module to receive the digital broadcasts while successively and automatically switching a plurality of channels arranged in a consecutive order in an automatic channel switching mode while showing video and audio data of digital broadcasting of each successive switched channel on the output unit during a predetermined time interval, and controlling the digital broadcasting data received in the digital broadcasting module to be transmitted to the output unit;

wherein the controller controls the digital broadcasting module to stop the automatic channel switching mode and to continuously receive and display video and audio data of a current channel, wherein the current channel is a channel whose video and data are being displayed on the output unit when the automatic channel switching is stopped, wherein the automatic channel switching is stopped when at least one of a call reception and a short message service (SMS) message reception is detected in the mobile communication device, wherein the plurality of channels comprises a predetermined broadcasting channel list that is acquired through an Electronic Program Guide (EPG) channel, wherein the controller controls the digital broadcasting module to display a stored image during a time required for switching from a first channel to a second channel, the first channel and the second channel are included in the predetermined broadcasting channel list, and the stored image is different from video of the first and second channels, and wherein the controller controls the digital broadcasting module to automatically switch the channels in a Picture-in-Picture (PIP) mode, wherein the output unit displays other video data of the digital broadcasting on a main screen while the automatically switched channel is displayed on a sub-screen.

2. The digital broadcasting receiver of claim 1, wherein the controller controls the digital broadcasting module to stop the automatic channel switching and to continuously receive a currently received broadcast upon which the automatic channel switching has stopped when a key input is received.

3. The digital broadcasting receiver of claim 1, wherein the predetermined broadcasting channel list is extracted from Electronic Program Guide (EPG) data.

4. A digital broadcasting receiver in a mobile communication device, the receiver comprising:

a digital broadcasting module for receiving digital broadcasts of multiple channels in a mobile communication device through a wireless communication network;

an output unit for outputting a sound and an image signals of the digital broadcasts; and a controller for controlling the digital broadcasting module to receive the digital broadcasts while successively and automatically switching a plurality of channels arranged in a consecutive order according to a predetermined broadcasting channel list in an automatic channel switching mode, and to output video and audio data of digital broadcasting of each successive switched channel on the output unit during a predetermined time interval, and controlling the digital broadcasting data received in the digital broadcasting module to be transmitted to the output unit;

wherein the controller controls the digital broadcasting module to stop the automatic channel switching mode and continuously receive and display video and audio data of a current channel, wherein the current channel is a channel whose video and data are being displayed on the output unit when the automatic channel switching is stopped, wherein the automatic channel switching is stopped when at least one of a call reception and a short message service (SMS) message reception is detected in the mobile communication device, wherein the plurality of channels comprise a predetermined broadcasting channel list that is acquired through an Electronic Program Guide (EPG) channel, wherein the controller controls the digital broadcasting module to display a stored image during a time required for switching from a first channel to a second channel, the first channel and the second channel are included in the predetermined broadcasting channel list, and the stored image is different from video of the first and second channels, and wherein the controller controls the digital broadcasting module to automatically switch the channels in a Picture-in-Picture (PIP) mode wherein the output unit displays other video data of the digital broadcasting on a main screen while the automatically switched channel is displayed on a sub-screen.

5. The digital broadcasting receiver of claim 4, wherein the controller controls the digital broadcasting module to stop the automatic channel switching and continuously receive a currently received broadcast upon which the automatic channel switching has stopped when a key input is received.

6. The digital broadcasting receiver of claim 4, further comprising a timer for notifying the controller of the predetermined time interval.

7. A digital broadcasting receiver in a mobile communication device, the receiver comprising:

a digital broadcasting module for receiving digital broadcasts of multiple channels in the mobile communication device through a wireless communication network;

an output unit for outputting video and audio signals of the digital broadcasts; and a controller for controlling the digital broadcasting module to receive digital broadcasting while successively and automatically switching a plurality of channels according to a predetermined time interval in an automatic channel switching mode arranged in a consecutive order according to a predetermined channel list during an automatic channel switching mode, controlling video data of the digital broadcasting corresponding to a channel being viewed, before starting the automatic channel switching mode, to be displayed on a main screen of a display unit, controlling video data of the digital broadcasting corresponding to the plurality of channels to be displayed on a sub-screen of the display unit during the automatic channel switching mode, and controlling the video data displayed on the sub-screen to be displayed on the main screen of the display unit and removing the displayed sub-screen, when a predetermined mobile communication device event is detected;

wherein the controller controls the digital broadcasting module to stop the automatic channel switching mode and continuously receive and display video and audio data of a current channel corresponding to the sub-screen, wherein the current channel is a channel whose video and data are being displayed on the output unit when the automatic channel switching is stopped, wherein the automatic channel switching is stopped when at least one of a call reception and a short message service (SMS) message reception is detected in the mobile communication device, wherein the predetermined broadcasting channel list is acquired through an Electronic Program Guide (EPG) channel, wherein the controller controls the digital broadcasting module to display a stored image during a time required for switching from a first channel to a second channel, the first channel and the second channel are included in the predetermined broadcasting channel list, and the stored image is different from video of the first and second channels, and wherein the controller controls the digital broadcasting module to automatically switch the channels in a Picture-in-Picture (PIP) mode wherein the output unit displays other video data of the digital broadcasting on a main screen while the automatically switched channel is displayed on a sub-screen.

8. The digital broadcasting receiver of claim 7, wherein the predetermined broadcasting channel list is extracted from an Electronic Program Guide (EPG) data.

9. The digital broadcasting receiver of claim 1, wherein the predetermined time interval is determined according to a user's selection.

10. The digital broadcasting receiver of claim 7, wherein the predetermined time interval is determined according to a user's selection.

11. The digital broadcasting receiver of claim 1, wherein, in the automatic channel switching mode, video and audio data of a first channel among the plurality of channels are received through the digital broadcasting module and buffered to a first channel buffer, video and audio data of a second channel following the first channel are received through the digital broadcasting module and buffered to a second channel buffer while the video and audio data of the first channel are buffered to the first channel buffer, after the video and audio data of the first channel stored in the first channel buffer are outputted during the predetermined time interval, the video and audio data of the second channel stored in the second channel buffer are outputted during the predetermined time interval, and upon completing output of the video and audio data of the first channel stored in the first channel buffer, video and audio data of a third channel following the second channel are received through the digital broadcasting module and buffered to the first channel buffer, wherein the video and audio data of the third channel are to be outputted during the predetermined time interval, after the video and audio data of the second channel stored in the second channel buffer are outputted during the predetermined time interval.

12. The digital broadcasting receiver of claim 7, wherein, in the automatic channel switching mode, video and audio data of a first channel among the plurality of channels are received through the digital broadcasting module and buffered to a first channel buffer, video and audio data of a second channel following the first channel are received through the digital broadcasting module and buffered to a second channel buffer while the video and audio data of the first channel are buffered to the first channel buffer, after the video and audio data of the first channel stored in the first channel buffer are outputted during the predetermined time interval, the video and audio data of the second channel stored in the second channel buffer are outputted during the predetermined time interval, and upon completing output of the video and audio data of the first channel stored in the first channel buffer, video and audio data of a third channel following the second channel are received through the digital broadcasting module and buffered to the first channel buffer, wherein the video and audio data of the third channel are to be outputted during the predetermined time interval, after the video and audio data of the second channel stored in the second channel buffer are outputted during the predetermined time interval.

* * * * *